United States Patent
Porterfield et al.

(10) Patent No.: US 12,515,810 B2
(45) Date of Patent: Jan. 6, 2026

(54) HYDROGEN GAS DETECTION FOR AIRCRAFT

(71) Applicant: Kidde Technologies Inc., Wilson, NC (US)

(72) Inventors: John W. Porterfield, Rolesville, NC (US); Adam Chattaway, Windsor (GB)

(73) Assignee: Kidde Technologies Inc., Wilson, NC (US)

( * ) Notice: Subject to any disclaimer, the term of this patent is extended or adjusted under 35 U.S.C. 154(b) by 122 days.

(21) Appl. No.: 18/507,498

(22) Filed: Nov. 13, 2023

(65) Prior Publication Data

US 2025/0153857 A1    May 15, 2025

(51) Int. Cl.
*B64D 37/32*    (2006.01)
*G01N 33/00*   (2006.01)
*G08B 21/16*   (2006.01)

(52) U.S. Cl.
CPC ........... *B64D 37/32* (2013.01); *G01N 33/005* (2013.01); *G08B 21/16* (2013.01)

(58) Field of Classification Search
CPC .... F02D 41/22; F02D 2041/225; G01M 3/26; F02C 7/22; F16L 2201/30
See application file for complete search history.

(56) References Cited

U.S. PATENT DOCUMENTS 4,862,731 A * 9/1989 Gates .................... G01M 3/229
                                                    73/40.7
5,932,797 A   8/1999 Myneni 2002/0187381 A1   12/2002 Monzel
2022/0170597 A1    6/2022 Saha et al.
2022/0307428 A1 *  9/2022 Sibbach ................... F02C 3/22
2022/0349343 A1   11/2022 Durocher
(Continued)

FOREIGN PATENT DOCUMENTS

CN    110146233 A    8/2019
CN    114440127 A    5/2022
(Continued)

OTHER PUBLICATIONS

Extended European Search Report for EP Application No. 24207048.0, dated Mar. 21, 2025, 6 pages.

*Primary Examiner* — Mirza F Alam
(74) *Attorney, Agent, or Firm* — Kinney & Lange, P.A.

(57) ABSTRACT

System and associated methods relate to detecting and responding to hydrogen leakage in an aircraft. The system includes a hydrogen tank and a fuel pipeline surrounded by an enclosed chamber. The system further includes one or more vacuum pumps fluidly coupled to the enclosed chamber to create the control volume vacuum. The system further includes vacuum sensors mounted within the control volume vacuum, configured to sense a vacuum pressure value. The system further includes hydrogen detectors fluidly connected downstream of the one or more vacuum pumps, configured to sense the hydrogen concentration of the exhaust from the one or more vacuum pumps. The system further includes a controller and an emergency vacuum. The controller is configured to evaluate whether an emergency hydrogen leak condition exists based upon the vacuum pressure value and the hydrogen concentration. The controller can then open a valve to operate emergency vacuum if necessary.

14 Claims, 5 Drawing Sheets

(56) References Cited

U.S. PATENT DOCUMENTS

| | | | | |
|---|---|---|---|---|
| 2022/0397479 A1* | 12/2022 | Shenouda | ............... | F02C 7/22 |
| 2023/0160773 A1* | 5/2023 | Berg | ............... | G01M 3/2876 |
| | | | | 73/40 |
| 2025/0100705 A1* | 3/2025 | Minas | ............... | B64D 37/32 |
| 2025/0101923 A1* | 3/2025 | Farah | ............... | B64D 37/005 |

FOREIGN PATENT DOCUMENTS

| | | |
|---|---|---|
| DE | 202010008927 U1 | 5/2011 |
| WO | 2022087207 A1 | 4/2022 |

\* cited by examiner

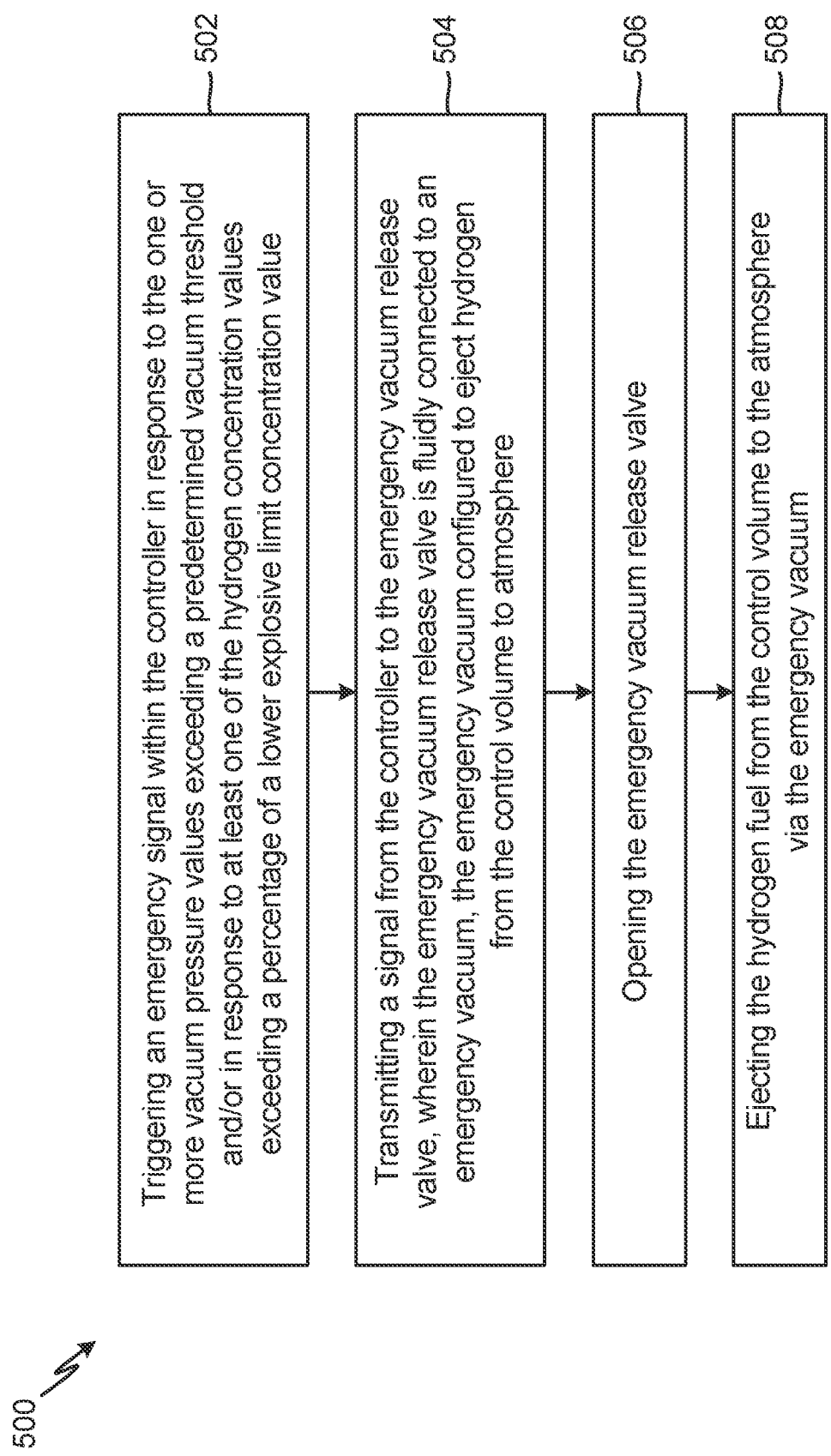

HYDROGEN GAS DETECTION FOR AIRCRAFT

BACKGROUND

Future transportation needs may require the elimination or significant reduction of carbon-based fuels. As such, alternatives including hydrogen combustion and hydrogen fuel cells represent attractive options for applications requiring zero emission of carbon dioxide ($CO_2$). Such applications, however, require storage of fuel at high pressure or low temperature depending on the state of matter of the hydrogen fuel. Further, the small molecular size, wide explosive mixture range, and visual transparency of hydrogen flames represent challenges to the use of hydrogen in aircraft applications. Thus, a system for hydrogen leakage detection and emergency response is desirable in order to prevent fires or explosions on board a hydrogen-fueled aircraft.

SUMMARY

A system for detecting hydrogen leakage in an aircraft, the aircraft including a hydrogen tank configured to store hydrogen fuel and a fuel pipeline fluidly connected between the hydrogen tank and a downstream engine, includes an enclosed chamber, the enclosed chamber surrounding the hydrogen tank and the fuel pipeline. The system further includes one or more vacuum pumps fluidly connected to an interior of the enclosed chamber to create a control volume vacuum within the enclosed chamber, the one or more vacuum pumps located downstream of the hydrogen tank. The system further includes one or more vacuum sensors mounted within the control volume vacuum. The system further includes one or more hydrogen detectors fluidly connected to a vacuum pump exhaust pipeline downstream of the one or more vacuum pumps.

A method for detecting hydrogen leakage in an aircraft, the aircraft including a hydrogen tank configured to store hydrogen fuel and a fuel pipeline fluidly connecting the hydrogen tank to a downstream engine, includes evacuating an enclosed chamber that surrounds the hydrogen tank and surrounds the fuel pipeline via one or more vacuum pumps to create a control volume vacuum. The method further includes sensing, via one or more vacuum sensors further includes sensing, via one or more hydrogen detectors fluidly connected downstream of the one or more vacuum pumps, one or more hydrogen concentration values. The method further includes transmitting the one or more vacuum pressure values and the one or more hydrogen concentration values to a controller. The method further includes evaluating, via the controller, whether an emergency condition is met in response to the one or more vacuum pressure values and/or the one or more hydrogen concentration values.

BRIEF DESCRIPTION OF THE DRAWINGS

FIG. 5 is a flowchart depicting a method for emergency response to a hydrogen leak within an aircraft.

DETAILED DESCRIPTION

According to the techniques of this disclosure, a system for hydrogen leakage detection on board an aircraft can be used to detect a leak in a hydrogen fuel source. The system operates by surrounding a hydrogen fuel tank and piping for fuel delivery with an enclosed chamber. The enclosed chamber is evacuated using one or more attached vacuum pumps to create an evacuated control volume. One or more vacuum sensors are placed around the hydrogen fuel tank and along the evacuated control volume in order to detect the vacuum pressure level. Further, various hydrogen sensors are placed downstream of the attached vacuum pumps. The vacuum sensors indicate if there is a change in the vacuum that may be indicative of a leak in the hydrogen fuel tank or a compromised control volume. The hydrogen sensors indicate if there is a concentration of hydrogen flowing in exhaust from the vacuum pumps. The presence of such a concentration can provide confirmation of a hydrogen leak in the hydrogen fuel tank.

The techniques of this disclosure also contemplate an emergency response system in the case of a hydrogen fuel leak. Such an emergency response system includes an emergency vacuum connected from the hydrogen fuel tank to the atmosphere. Thus, in the case of a leak as indicated by signals received from the vacuum sensors and the hydrogen sensors, the leaked hydrogen fuel can be ejected to the atmosphere outside the aircraft to prevent an explosion while the hydrogen tank valves are closed to prevent additional hydrogen fuel flow or leakage.

Figure 1:
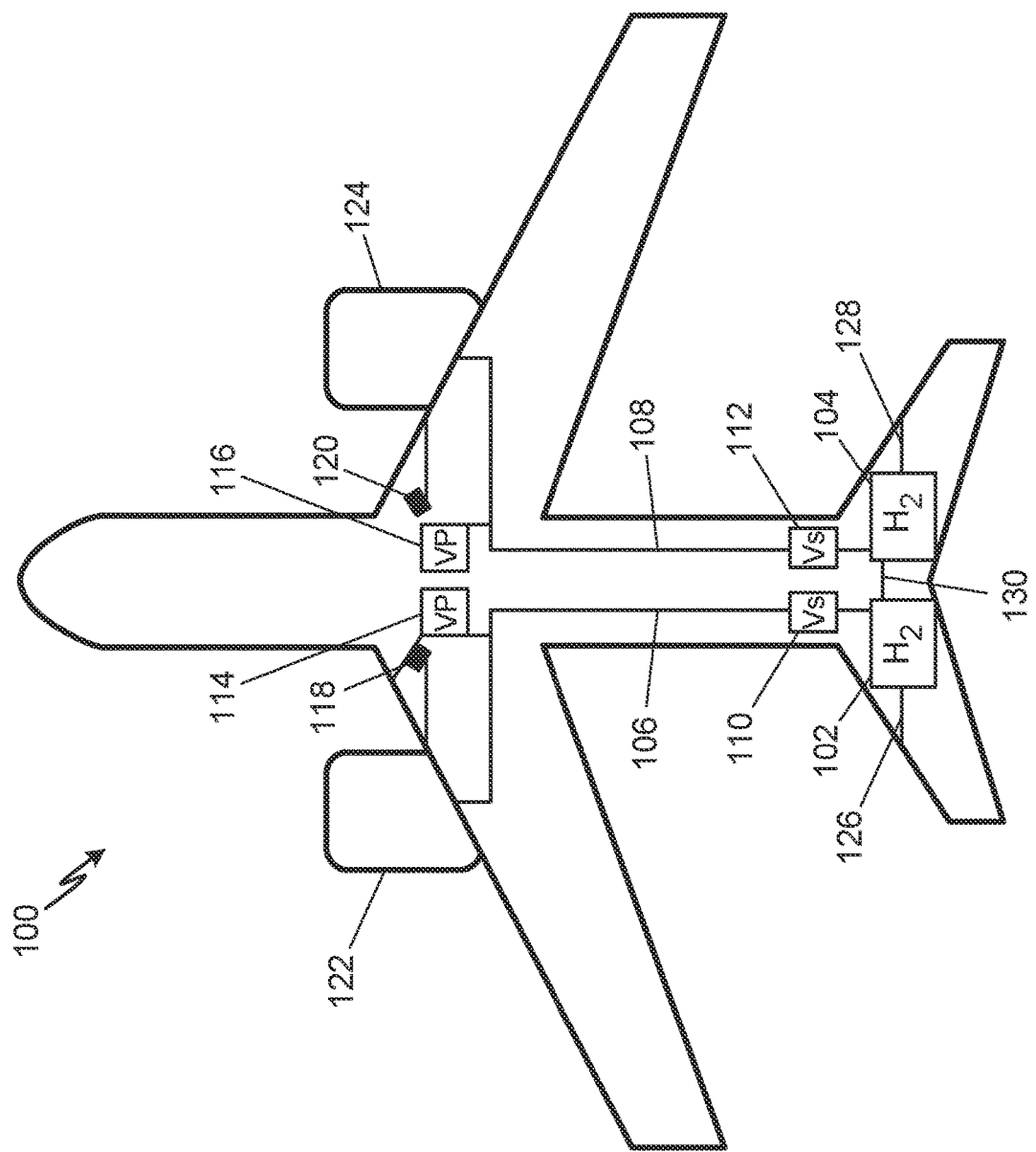
FIG. 1 is a diagram of an aircraft fuel network including hydrogen leakage detection.

FIG. 1 is a diagram of aircraft fuel network 100. Aircraft fuel network 100 includes hydrogen leakage detection capabilities. Aircraft fuel network 100 includes first hydrogen tank 102, second hydrogen tank 104, first fuel pipeline 106, second fuel pipeline 108, first vacuum sensor 110, second vacuum sensor 112, first vacuum pump 114, second vacuum pump 116, first hydrogen detector 118, second hydrogen detector 120, first engine 122, second engine 124, first hydrogen evacuation line 126, second hydrogen evacuation line 128, and cross feed connection 130.

First hydrogen tank 102 is connected to first engine 122 via first fuel pipeline 106. First hydrogen tank 102 is also connected to the surrounding atmosphere via first hydrogen evacuation line 126. First hydrogen tank 102 is further connected to second hydrogen tank 104 via cross feed connection 130. First vacuum sensor 110 is mounted along first fuel pipeline 106. First vacuum pump 114 is mounted along first fuel pipeline 106. First hydrogen detector 118 is mounted between first vacuum pump 114 and first engine 122.

Second hydrogen tank 104 is connected to second engine 124 via second fuel pipeline 108. Second hydrogen tank 104 is also connected to the surrounding atmosphere via second hydrogen evacuation line 128. Second hydrogen tank 104 is further connected to first hydrogen tank 102 via cross feed connection 130. Second vacuum sensor 112 is mounted along second fuel pipeline 108. Second vacuum pump 116 is mounted along second fuel pipeline 108. Second hydrogen detector 120 is mounted between second vacuum pump 116 and second engine 124.

In operation, first hydrogen tank 102 is configured to store hydrogen fuel for aircraft fuel network 100. The hydrogen fuel can be liquid hydrogen, stored at sufficiently low temperatures (i.e. below −253° C.) to maintain the liquid state. Fuel flows from first hydrogen tank 102 along first fluid pipeline 108 to first engine 122. First vacuum pump 114 creates a control volume vacuum surrounding first fuel pipeline 108 and first hydrogen tank 102 by evacuating an enclosed chamber surrounding first fuel pipeline 108 and first hydrogen tank 102. In some embodiments, there can be multiple vacuum pumps similar to first vacuum pump 114 along first fuel pipeline 108, each of the vacuum pumps configured to create a control volume vacuum surrounding first fuel pipeline 108 and first hydrogen tank 102. The configuration of the control volume along first fuel pipeline 108 is shown and described in more detail below with respect to FIG. 2.

First vacuum sensor 110 is positioned along first fluid pipeline 106 in fluid communication with the control volume vacuum created by first vacuum pump 114. First vacuum sensor 110 is configured to sense the vacuum level within first fluid pipeline 106. In the case of a hydrogen leak from first hydrogen tank 126 or along first fluid pipeline 106, first vacuum sensor 110 can detect a vacuum pressure level that is above a predefined threshold, thereby indicating a leak. In other embodiments, first vacuum sensor 110 is configured to measure the change in vacuum pressure over time. In such an embodiment, a rapid change in the vacuum level can be indicative of a hydrogen leak.

Aircraft fuel network 100 can include multiple vacuum sensors, similar to first vacuum sensor 110, positioned along first fuel pipeline 108 and around first hydrogen tank 102. Such vacuum sensors can provide redundancy and false alarm immunity. For example, an alarm indicative of a fuel leak can be configured to trigger only if two or more vacuum sensors detect an abnormal vacuum level above a predefined threshold or a rate of change of the vacuum level indicative of a sharp rise in pressure. Such a configuration can prevent a single faulty sensor from triggering an alarm condition in the case where there is no fuel leakage.

First hydrogen detector 118 is positioned between first vacuum pump 114 and the atmosphere external to the aircraft. First hydrogen detector 118 is also connected to first engine 122. As air is removed from the control volume to create the surrounding vacuum around first hydrogen tank 102 and first pipeline 106, it is routed through first hydrogen detector 118, then to the atmosphere. Thus, first hydrogen detector 118 can trace if hydrogen has leaked into the control volume vacuum and return a hydrogen concentration value.

First hydrogen detector 118 can be an electrochemical detector, an infrared signature detector, a metal oxide detector, or any other type of hydrogen detector known in the art. First hydrogen detector 118 is configured to sense a concentration of hydrogen within exhaust output from first vacuum pump 114. In some embodiments, first hydrogen detector 118 can require atmospheric oxygen to be a catalyst in sensing hydrogen concentrations. In such an embodiment, first hydrogen detector 118 can receive bleed air from first engine 122. In other embodiments, first hydrogen detector 118 can be connected to an air cycle system within the aircraft and receive cabin air from the connected air cycle system.

First hydrogen detector 118 can operate as a secondary check for hydrogen leakage, in addition to a primary check performed by first vacuum sensor 110. In some embodiments, an emergency condition is triggered only when first vacuum sensor 110 and first hydrogen detector 118 both return signals indicative of a fuel leak. In other embodiments, an emergency condition is triggered when either first vacuum sensor 110 returns a vacuum pressure value indicative of a fuel leak or first hydrogen detector 118 returns a hydrogen concentration value indicative of a fuel leak. Additional description regarding a control network for determining such values will be described in the description of FIG. 3 below.

Aircraft fuel network 100 can include multiple hydrogen detectors, similar to first hydrogen detector 118. The multiple hydrogen detectors can be mounted downstream of multiple vacuum pumps, thereby sensing a concentration of hydrogen within the fluid exiting each of the multiple vacuum pumps.

First hydrogen evacuation line 126 connects first hydrogen tank 102 to the surrounding atmosphere outside the aircraft. In response to a vacuum pressure value indicative of a fuel leak from first vacuum sensor 110 and/or a hydrogen concentration value indicative of a fuel leak from first hydrogen detector 118, hydrogen fuel from within the control volume vacuum can be ejected overboard via first hydrogen evacuation line 126. Such evacuation can be preventative of an explosion.

Second hydrogen tank 104, second pipeline 108, second vacuum sensor 112, second vacuum pump 116, second hydrogen detector 120, and second engine 124 operate in a similar fashion to first hydrogen tank 102, first pipeline 106, first vacuum sensor 110, first vacuum pump 114, first hydrogen detector 118, and first engine 122, respectively. The parallel structure is intended to show a typical 2-engine mode of operation on board an aircraft. It is understood, however, that any number of fuel tanks can be present in an aircraft for the purposes of this disclosure. First hydrogen tank 102 is connected to second hydrogen tank 104 via cross feed connection 130. Thus, in the case that one of first engine 122 and second engine 124 fails, fuel from first hydrogen tank 102 can be routed to second hydrogen tank 104 via cross feed connection 130, or vice versa.

Aircraft fuel network 100 provides several advantages involving fuel leakage detection. Aircraft fuel network 100 allows for detection of a leak via one or more vacuum sensors. Such a configuration relieves the need for hydrogen detectors to be placed near a hydrogen tank. Placing hydrogen detectors near a hydrogen tank is undesirable as hydrogen detectors have a limited temperature, humidity, and environmental exposure tolerance. As described, the hydrogen tanks may require temperatures on the order of −253° C. in order to keep hydrogen in a liquid state. Additionally, hydrogen detectors can have a limited functional life before calibration levels shift which can result in false alarms. Thus, using a vacuum sensor is advantageous to indicate a hydrogen leak.

In addition to detecting hydrogen, the vacuum sensor will detect air leaks if the control volume sealing is compromised. Although this does not pose as serious risk as a hydrogen leak, it is still important that the flight crew are notified of this as it indicates that future maintenance or repair of the control volume sealing.

Further, aircraft fuel network 100 still allows for use of a hydrogen detector as a mechanism for false alarm immunity. Hydrogen detectors, such as first hydrogen detector 118, are placed downstream of vacuum pumps, such as first vacuum pump 114, thus still allowing the hydrogen detectors to detect leaking hydrogen. Hydrogen detectors may not work in a vacuum as atmospheric oxygen may be required as a catalyst for the hydrogen detectors to make hydrogen concentration measurements. Thus, the present configuration allows for hydrogen detection outside the vacuum and provides atmospheric oxygen from bleed air or cabin air, thereby allowing the hydrogen detectors to function and confirm the presence of a hydrogen leak. Further, the placement of hydrogen detectors away from the fuel source allows for ease of maintenance, as the hydrogen detectors are more readily accessible by maintenance crews.

Figure 2:
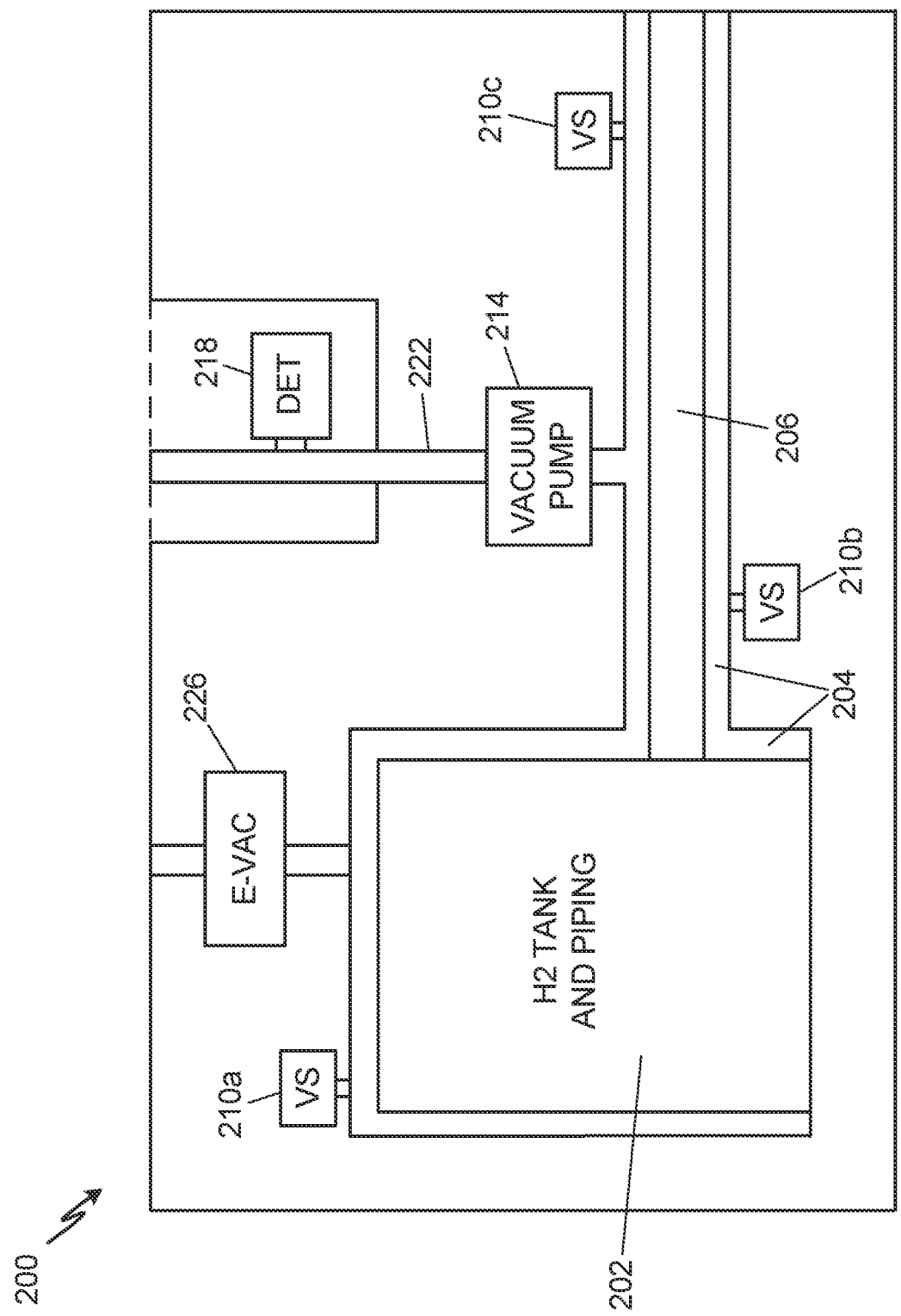
FIG. 2 is a diagram of a system for detecting hydrogen leakage within an aircraft.

FIG. 2 is a diagram of system 200 for detecting hydrogen leakage within an aircraft. System 200 includes hydrogen tank 202, control volume vacuum 204, fuel pipeline 206, vacuum sensors 210a, 210b and 210c, vacuum pump 214, vacuum pump pipeline 222, hydrogen detector 218, and emergency vacuum 220.

Hydrogen tank 202 is fluidly coupled to fuel pipeline 206. Hydrogen tank 202 and fuel pipeline 206 are surrounded by control volume vacuum 204. Vacuum sensors 210a, 210b, and 210c are mounted at various locations along control volume vacuum 204. Vacuum pump 214 is fluidly coupled to control volume vacuum 204 downstream of hydrogen tank 202. Vacuum pump pipeline 222 connects vacuum pump 214 to an external destination (e.g. the atmosphere surrounding the aircraft). Hydrogen detector 218 is mounted along vacuum pump pipeline 222 such that hydrogen detector 218 is in fluid communication with the output of vacuum pump 214. A first end of emergency vacuum 220 is fluidly coupled to control volume vacuum 204 surrounding hydrogen tank 202 and a second end of emergency vacuum 220 is coupled to the atmosphere.

In operation, hydrogen tank 202 contains hydrogen fuel for fueling an aircraft. Fuel flows from hydrogen tank 202, to a downstream engine via fuel pipeline 206. Hydrogen tank 202 and fuel pipeline 206 are surrounded by control volume vacuum 204. Control volume vacuum 204 is a vacuum created by the operation of vacuum pump 214. Thus, vacuum pump 214 acts to decrease the pressure within control volume vacuum 204, thereby creating a vacuum, such as control volume vacuum 204, surrounding hydrogen tank 202 and fuel pipeline 206. Such a configuration allows the hydrogen fuel to maintain its cooler temperature (e.g. approximately −253° C. for liquid hydrogen), thereby maintaining the pressure of the liquid hydrogen within the fuel tank at a safe level.

Vacuum sensors 210a, 210b, and 210c are configured to sense a vacuum pressure at various locations along control volume vacuum 204. While three vacuum sensors are depicted in system 200, it is understood that any number of vacuum sensors similar to vacuum sensors 210a, 210b, and 210c can be mounted around control volume vacuum 204. In the case of a leak wherein hydrogen flows into control volume vacuum 204, the pressure of control volume vacuum 204 will rise. Thus, the measurements taken by vacuum sensors 210a, 210b, and 210c will sense the rise in pressure, thereby indicating a hydrogen fuel leak, or an air leak.

In some embodiments, vacuum sensors 210a, 210b, and 210c are connected to a controller (not pictured). In such an embodiment, vacuum sensors 210a, 210b, and 210c can each transmit a vacuum pressure measurement to the controller. In some embodiments, the vacuum pressure measurements are compared to a threshold value. In the case where one or more of the vacuum pressure measurements are below the threshold value, an alarm indicative of a hydrogen fuel leak can be triggered. In some embodiments, the controller receives a time sequence of vacuum pressure measurements from vacuum sensors 210a, 210b, and 210c. In such embodiments, the controller can be configured to trigger an alarm indicative of a hydrogen fuel leak if the change in pressure over time exceeds a predetermined rate.

Hydrogen detector 218 is configured to sense a hydrogen concentration downstream of vacuum pump 214. Vacuum pump 214 is configured and arranged to vent the exhaust from control volume vacuum 204 to the atmosphere, external to the aircraft, such that the exhaust passes through hydrogen detector 218. In some embodiments, hydrogen detector 218 requires atmospheric oxygen to be a catalyst in sensing hydrogen concentrations. In such embodiments, hydrogen detector 218 can be connected to a downstream engine where bleed air is directed to hydrogen detector 218. Hydrogen detector 218 can also or alternatively be connected to an aircraft air cycle system wherein cabin air is directed to hydrogen detector 218.

While only vacuum pump 214 and hydrogen detector 218 are shown in the depiction of system 200 shown in FIG. 2, it is understood that any number of vacuum pumps and corresponding downstream hydrogen detectors can be included. In the case of a leak where hydrogen flows into control volume vacuum 204, the hydrogen fuel will be vented through vacuum pump 214 and hence will pass through hydrogen detector 218 as the hydrogen fuel is vented to atmosphere. Thus, hydrogen fuel detector 218 will sense a concentration of hydrogen in the exhaust, thereby indicating a hydrogen fuel leak.

In some embodiments, hydrogen detector 218 is connected to a controller (not pictured). In such an embodiment, hydrogen detector 218 can transmit a hydrogen concentration value to the controller. In some embodiments, the hydrogen concentration value is compared to a threshold value. In the case wherein the hydrogen concentration value is above the threshold value, an alarm indicative of a hydrogen fuel leak can be triggered. The threshold value can be a percentage of the Lower Explosive Limit (LEL) of hydrogen. The LEL can be defined as the lowest concentration of hydrogen in air that can catch fire or explode in the presence of heat or sparks. The LEL of hydrogen is, for example, 4% by volume. Thus, in some examples, an alarm signal is triggered by the controller if the hydrogen concentration value detected by hydrogen detector 218 is >2%, which is >50% of the LEL. The percentage of the LEL resulting in an alarm can be any predetermined percentage.

In some embodiments, various alarm levels can be assigned to various hydrogen concentration values detected by hydrogen detector 218. For example, a low level alarm can be triggered when the hydrogen concentration value is between 12.5% and 25% of the LEL, and a high level alarm can be triggered when the hydrogen concentration value is between 25% and 50% of the LEL. The percentage ranges described are merely exemplary, and it is understood that any other percentage ranges can be used for the described embodiment. In some embodiments, the low level alarm results in the generation and transmission of a warning signal to the vehicle operator via a connected aircraft communication system. In some embodiments, the high level alarm results in action being taken, such as operation of emergency vacuum 220.

Emergency vacuum 220 is configured to vent residual hydrogen fuel from control volume vacuum 204 to the atmosphere outside of the aircraft in the case where a hydrogen leak is detected. Emergency vacuum 220 can be activated in response to a control signal received from a controller (not pictured). Additional details about the emergency response procedures including the operation of the controller and emergency vacuum 220 will be described in the description of FIG. 3 below.

System 200 for detecting hydrogen leakage within an aircraft is a more detailed depiction of aircraft fuel network 100, and hence system 200 provides many similar advantages to those described with respect to aircraft fuel network 100. System 200 allows for detection of a hydrogen fuel leak via one or more vacuum sensors, such as vacuum sensors 210a, 210b, and 210c. Such a configuration relieves the need for hydrogen detectors to be placed near a hydrogen tank. System 200 still allows for use of a hydrogen detector as a mechanism for false alarm immunity. Hydrogen detectors, such as hydrogen detector 218, are placed downstream of respective vacuum pumps, such as vacuum pump 214, thus still allowing the hydrogen detector to detect a concentration of hydrogen fuel. Further, the placement of hydrogen detector 218 downstream of vacuum pump 214 allows for ease of maintenance, as hydrogen detector 218 does not necessarily need to be placed near hydrogen tank 202, and can instead be placed in areas that are more accessible for maintenance.

Figure 3:
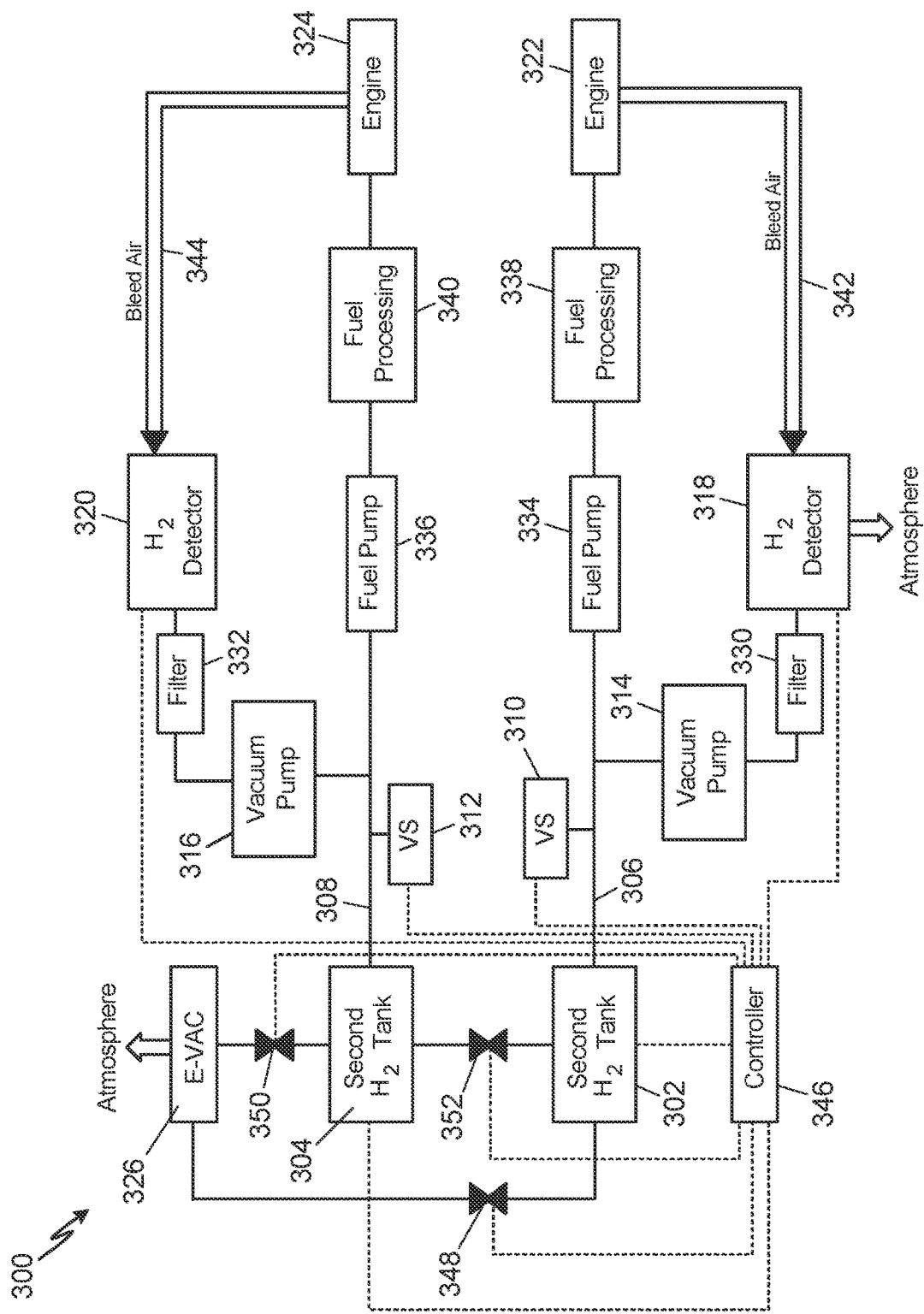
FIG. 3 is a schematic view of a control system for emergency response to hydrogen leakage within an aircraft.

FIG. 3 is a schematic view of a control system 300 for emergency response to hydrogen leakage within an aircraft. Control system 300 includes parts analogous to those defined in aircraft fuel network 100 of FIG. 1. The reference numerals of the analogous parts of FIG. 1 are incremented by 200 and include: first hydrogen tank 302, second hydrogen tank 304, first fuel pipeline 306, second fuel pipeline 308, first vacuum sensor 310, second vacuum sensor 312, first vacuum pump 314, second vacuum pump 316, first hydrogen detector 318, second hydrogen detector 320, first engine 322, second engine 324, and emergency vacuum 326. Control system 300 further includes first filter 330, second filter 332, first fuel pump 324, second fuel pump 336, first fuel processing unit 338, second fuel processing unit 340, first bleed air pipeline 342, second bleed air pipeline 344, controller 346, first vacuum evacuation valve 348, second vacuum evacuation valve 350, and cross feed valve 352.

First fuel pipeline 306 fluidly connects first hydrogen tank 302 to first fuel pump 334, first fuel pump 334 to first fuel processing unit 338, and first fuel processing unit 338 to first engine 322. First fuel pipeline 306 is surrounded by a control volume vacuum, such as control volume vacuum 204 of FIG. 2. First hydrogen tank 302 is further connected to second hydrogen tank 304 via cross feed valve 352. First vacuum sensor 310 is mounted along first fuel pipeline 306. First vacuum pump 314 is mounted along and fluidly connected to first fuel pipeline 306. First vacuum pump 316 is fluidly connected to first filter 332. First hydrogen detector 318 is fluidly connected to first filter 330. First hydrogen detector 318 is also fluidly connected to first engine 332 via first bleed air pipeline 342.

Second fuel pipeline 308 fluidly connects second hydrogen tank 304 to second fuel pump 336, second fuel pump 336 to second fuel processing unit 340, and second fuel processing unit 340 to second engine 324. Second fuel pipeline 308 is surrounded by a control volume vacuum, such as control volume vacuum 204 of FIG. 2. Second hydrogen tank 304 is further connected to first hydrogen tank 302 via cross feed valve 352. Second vacuum sensor 314 is mounted along second fuel pipeline 308. Second vacuum pump 316 is mounted along and fluidly connected to second fuel pipeline 308. Second vacuum pump 316 is fluidly connected to second filter 332. Second hydrogen detector 320 is fluidly connected to second filter 332. Second hydrogen detector 320 is also fluidly connected to second engine 324 via second bleed air pipeline 344.

Controller 346 is electrically connected to first tank 302, second tank 304, first vacuum sensor 310, second vacuum sensor 312, first hydrogen detector 318, second hydrogen detector 320, first vacuum evacuation valve 348, second vacuum evacuation valve 350, and cross feed valve 352. The electrical connections depicted can be wired connections, wireless connections, or a combination of wired and wireless connections, and are depicted by dashed lines in FIG. 3 to distinguish from physical connections for fluids, etc.

The hydrogen fuel flow across control system 300 operates as follows. First hydrogen tank 302 contains hydrogen fuel for first engine 322. Hydrogen fuel from first hydrogen tank 302 is pumped towards first engine 322 along first fuel pipeline 306 by operation of first fuel pump 334. First fuel pump 334 can be any fuel pump used for pumping fuel from a supply to an engine. Hydrogen tank 302 and first fuel pipeline 306 are surrounded by an enclosed chamber. By operation of first vacuum pump 314 the enclosed chamber becomes a control volume vacuum, such as control volume vacuum 204 (FIG. 2). First vacuum pump 314 is fluidly coupled to first fuel pipeline 306, downstream of first hydrogen tank 302. Prior to reaching first engine 322, hydrogen fuel from first hydrogen tank 302 can go through first fuel processing unit 338. First fuel processing unit 338 can be any number of fuel processing mechanisms required to process hydrogen fuel prior to the hydrogen fuel entering the engine. Some non-limiting examples of fuel processing mechanisms include a low-pressure fuel valve, a heat exchanger, a fuel filter, and/or a high-pressure pump. The order and physical arrangement of the fuel processing mechanisms can be determined based on desired fuel processing conditions. The hydrogen fuel is then routed to first engine 322, where it can be ignited and exhausted.

First vacuum sensor 310 is mounted along the control volume vacuum of first fuel pipeline 306. As hydrogen fuel is pumped from first hydrogen fuel tank 302 toward first engine 322, first vacuum sensor 310 measures the vacuum pressure level of the control volume vacuum surrounding first fuel pipeline 306. As described above, there may be any number of vacuum sensors similar to first vacuum sensor 310 fluidly coupled to the vacuum control volume surrounding first fuel pipeline 306 or surrounding first hydrogen tank 302. First vacuum sensor 310 can measure a vacuum pressure value of the vacuum control volume, and transmit the vacuum pressure value to controller 346. First vacuum sensor 310 can measure a time sequence of vacuum pressure values of the vacuum control volume, and transmit the time sequence of vacuum pressure values to controller 346.

First hydrogen detector 318 is configured to sense a hydrogen concentration downstream of vacuum pump 314. First vacuum pump 314 vents the exhaust from the control volume vacuum to atmosphere such that the exhaust passes through first filter 330 and then through first hydrogen detector 318. First filter 330 filters the exhaust prior to the exhaust reaching first hydrogen detector 318. Doing so removes potential contaminants, and enhances the accuracy of the reading from first hydrogen detector 318. After the exhaust passes first hydrogen detector 318, the exhaust is vented to the atmosphere, external to the aircraft. In some embodiments, first hydrogen detector 318 requires atmospheric oxygen to be a catalyst in sensing hydrogen concentrations. First hydrogen detector 318 can be connected to a first engine 322 such that bleed air is directed to first hydrogen detector 318 via first bleed air pipeline 342, as shown in FIG. 3. First hydrogen detector 318 can also or alternatively be connected to an aircraft air cycle system wherein cabin air is directed to first hydrogen detector 318.

The electrical control and emergency response of control system 300 operates as follows. First vacuum sensor 310 transmits the detected vacuum pressure value to controller 316. First hydrogen detector 318 transmits the detected hydrogen concentration value to controller 316. Controller 316 is configured to evaluate whether an emergency condition exists based upon the received vacuum pressure value and the received hydrogen concentration value.

In some embodiments, controller 316 determines that an emergency condition exists if one or more of the vacuum pressure values exceeds a predetermined vacuum threshold. In other embodiments, controller 316 determines that an emergency condition exists if a time sequence of vacuum pressure values exceeds a predetermined rate of change. In some embodiments, the one or more vacuum pressure values can come from more than one vacuum pressure sensors. Controller 316 can be configured to output an emergency condition only if multiple vacuum pressure sensors return vacuum pressure values that exceed the predetermined vacuum pressure threshold or the predetermined rate of change. Such a configuration can mitigate false alarm conditions.

In some embodiments, controller 316 determines that an emergency condition exists if one or more of the hydrogen concentration values exceeds a predetermined hydrogen concentration threshold. The predetermined hydrogen concentration threshold can be a percentage of the Lower Explosive Limit (LEL) of hydrogen. The LEL of hydrogen is, for example, 4% by volume. Thus, in some examples, an emergency condition exists if the hydrogen concentration value detected by hydrogen detector 218 is >2%, which is >50% of the LEL. The percentage of the LEL resulting in an alarm can be any predetermined percentage. In some embodiments, the one or more hydrogen concentration values can come from more than one hydrogen detector. The multiple hydrogen detectors can be downstream of multiple vacuum pumps. Controller 316 can be configured to output an emergency condition only if multiple hydrogen detectors return hydrogen concentration values that exceed the predetermined hydrogen concentration threshold. Such a configuration can mitigate false alarm conditions.

In some embodiments, controller 316 determines that an emergency condition exists when one or more of the vacuum pressure values exceeds a predetermined vacuum threshold and one or more of the hydrogen concentration values exceeds a predetermined hydrogen concentration threshold. Controller 316 can be configured to prevent false alarms by requiring vacuum pressure values in excess of the predetermined vacuum threshold from multiple vacuum sensors. Similarly, controller 316 can be configured to prevent false alarms by requiring hydrogen concentration values in excess of the predetermined hydrogen concentration threshold from multiple hydrogen detectors.

In some embodiments, controller 316 differentiates between a hydrogen leakage emergency condition and an air leakage emergency condition. Controller 316 can be configured to output a hydrogen leakage emergency alarm in response to one or more of the vacuum pressure values exceeding a predetermined vacuum threshold and one or more of the hydrogen concentration values exceeding a predetermined hydrogen concentration threshold. Controller 316 can be configured to output an air leakage emergency alarm in response to one or more of the vacuum pressure values exceeding a predetermined vacuum threshold while one or more of the hydrogen concentration values do not exceed a predetermined hydrogen concentration threshold. In the air leakage emergency condition, the vacuum control volume is breached, thereby allowing air in the volume, but may still be sealed against hydrogen leakage, as indicated by the fact that the hydrogen concentration does not exceed the predetermined hydrogen concentration threshold, as measured by the one or more hydrogen detectors.

Various responses to an emergency condition from controller 346 can be implemented. In one embodiment, in response to an emergency condition, controller 346 transmits a signal to open first vacuum evacuation valve 348, rendering emergency vacuum 326 operational. Emergency vacuum 326 vents excess hydrogen fuel within the control volume vacuum to atmosphere external to the aircraft. Simultaneously, controller 346 transmits a signal to first hydrogen tank 302 to close any valves that permit hydrogen flow. Such a configuration mitigates the risk of a fire event or explosion in the case that a hydrogen leak is detected. In one embodiments, in response to an air leakage emergency condition wherein there is a leak of air (not hydrogen) into the control volume, controller 346 transmits a signal to prompt a short term opening of first vacuum evacuation valve 348, rendering emergency vacuum 326 operational. Such an action can prevent the liquid hydrogen from overheating. Controller 346 also transmits a warning signal to the crew, indicating that future maintenance is required.

Responses to an emergency condition from controller 346 can also vary in levels. For example, there may be a low-level alarm and a high-level alarm. The low-level alarm can be triggered when either one or more of the vacuum pressure values exceeds a predetermined vacuum threshold or one or more of the hydrogen concentration values exceeds a predetermined hydrogen concentration threshold. In other embodiments, the low-level alarm can be triggered when only one of multiple vacuum sensors returns a vacuum pressure value in excess of the predetermined vacuum threshold, while others of the multiple vacuum sensors return vacuum pressure values below the predetermined vacuum threshold. Further, the low-level alarm can be triggered when only one of multiple hydrogen detectors returns a hydrogen concentration value in excess of the predetermined hydrogen concentration threshold, while others of the multiple hydrogen detectors return hydrogen concentration values below the predetermined hydrogen concentration threshold. A low-level alarm can also be triggered when an air leakage emergency condition is present, but not a hydrogen leakage emergency condition. In still other embodiments, a low level alarm can be triggered when the hydrogen concentration value is between 12.5% and 25% of the LEL, and a high level alarm can be triggered when the hydrogen concentration value is between 25% and 50% of the LEL.

A low-level alarm can result in a warning signal being sent from controller 346 to an aircraft flight crew via a connected aircraft communication system. A high-level alarm can result in the opening of first vacuum evacuation valve 348, rendering emergency vacuum 326 operational in addition to a warning signal being sent from controller 346 to an aircraft flight crew via a connected aircraft communication system.

Second hydrogen tank 304, second fuel pipeline 308, second vacuum sensor 312, second vacuum pump 316, second hydrogen detector 320, second engine 324, second filter 332, second fuel pump 336, second fuel processing unit 340, second bleed air pipeline 344, and second vacuum evacuation valve 350 operate in a similar fashion to first hydrogen tank 302, first fuel pipeline 306, first vacuum sensor 310, first vacuum pump 314, first hydrogen detector 318, first engine 322, first filter 330, second filter 332, first fuel pump 324, first fuel processing unit 338, first bleed air pipeline 342, and first vacuum evacuation valve 348, respectively. The parallel structure is intended to show a typical 2-engine mode of operation on board an aircraft. It is understood, however, that any number of fuel tanks can be present in an aircraft for the purposes of this disclosure. First hydrogen tank 302 is connected to second hydrogen tank 304 via cross feed valve 352. Thus, in the case of engine failure of either first engine 322 or second engine 324, or in the case of hydrogen tank damage of either first hydrogen tank 302 or second hydrogen tank 324, controller 346 can send a signal to open cross feed valve 352 for hydrogen fuel transfer form first hydrogen tank 302 to second hydrogen tank 304, or vice versa.

Control system 300 for emergency response to hydrogen leakage within an aircraft provides the benefit of emergency response to a multi-level system of hydrogen leakage detection, such as system 200. Control system 300 is an extension of system 200, and thus provides the same benefits, including detection of a hydrogen fuel leak via one or more vacuum sensors, and/or via one or more hydrogen detectors. Control system 300 also implements false alarm immunity by operation of controller 346, which can be configured with various levels of emergency condition detection, thereby reducing the number of false alarms due to faulty equipment or incorrect readings. Further, control system 300 allows for a rapid response to prevent a fire event or explosion by signaling the opening of first vacuum evacuation valve 348 and/or second vacuum evacuation valve 350 in response to an emergency condition. Thus, control system 300 is able to detect and mitigate dangerous conditions due to hydrogen fuel leaks.

Figure 4:
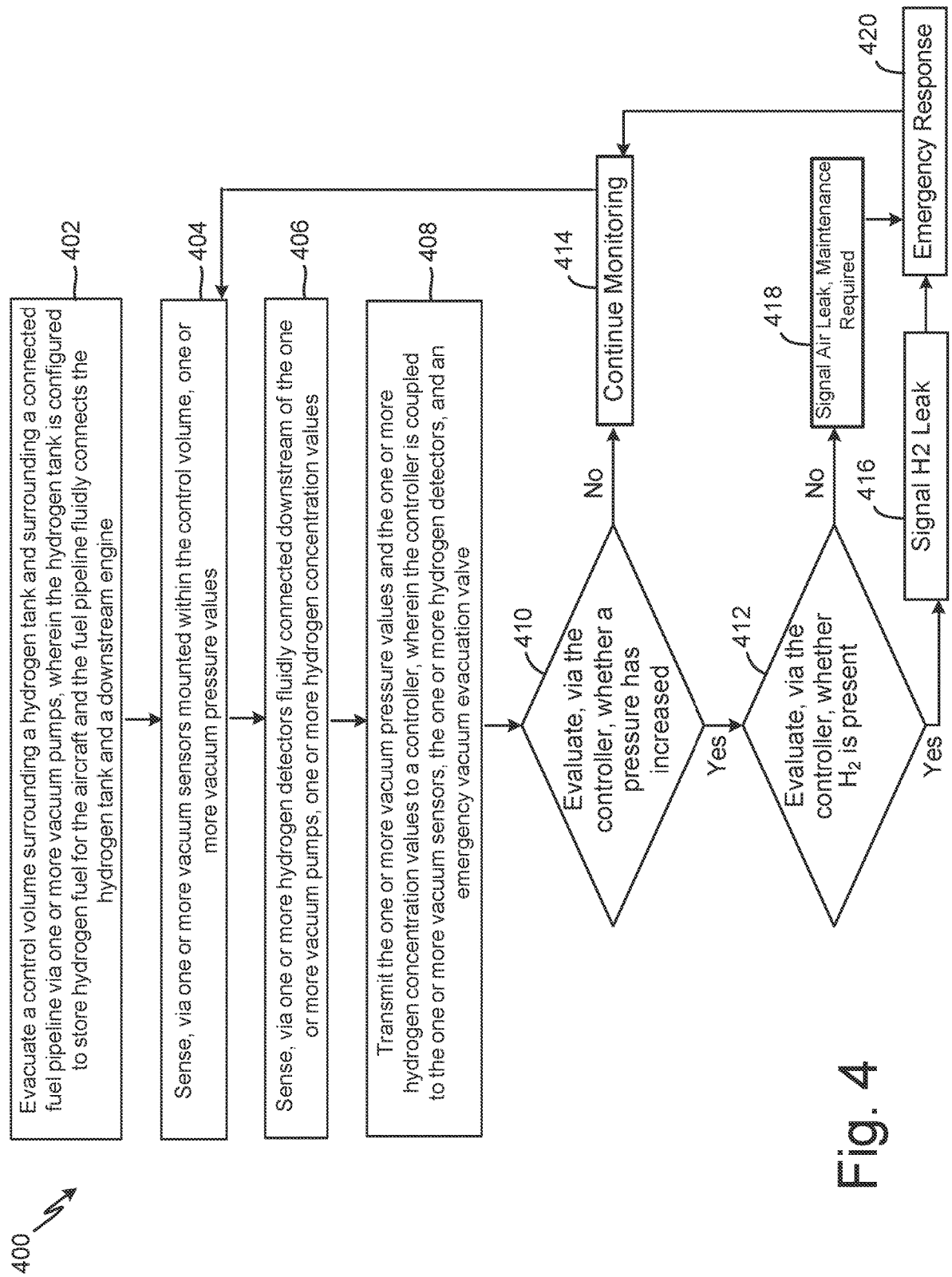
FIG. 4 is a flowchart depicting a method for detecting hydrogen leakage within an aircraft.

FIG. 4 depicts hydrogen leakage detection method 400. For the purposes of illustration, reference will be made to parts contained within control system 300 for emergency response to hydrogen leakage within an aircraft, as depicted in FIG. 3.

Method 400 begins at step 402, wherein one or more vacuum pumps, such as first vacuum pump 314, evacuates a control volume surrounding a hydrogen tank, such as first hydrogen tank 302, and surrounding a fuel pipeline, such as first fuel pipeline 306. The hydrogen tank is configured to store hydrogen fuel for the aircraft and the fuel pipeline fluidly connects the hydrogen tank and a downstream engine, such as first engine 322. At step 404, the one or more vacuum sensors mounted within the control volume sense one or more vacuum pressure values. At step 406, one or more hydrogen detectors, such as first hydrogen detector 318, are connected downstream of the one or more vacuum pumps and are configured to sense one or more hydrogen concentration values. At step 408, the one or more vacuum pressure sensors transmit the one or more vacuum pressure valves to a controller, such as controller 346. The one or more hydrogen detectors also transmit the one or more hydrogen concentration values to the controller. The controller is electrically connected to the one or more vacuum sensors, the one or more hydrogen detectors. The controller is also connected to an emergency vacuum evacuation valve, such as first vacuum evacuation valve 348.

At decision step 410, the controller evaluates whether the vacuum pressure within the control volume has increased based upon the one or more vacuum pressure values. If the controller determines that the vacuum pressure has not increased, then, at step 414, the system continues monitoring the one or more vacuum pressure values and the one or more hydrogen concentration values by returning to step 404. If the controller determines that a vacuum pressure has increased, the system proceeds to step 412.

At decision step 412, the controller evaluates whether $H_2$ is present in the control volume based upon the one or more hydrogen concentration values. If the controller determines that there is no $H_2$ present, or that the concentration of $H_2$ is below the LEL of $H_2$, the system proceeds to step 418, wherein the controller signals an air leak, based upon the evaluation at decision step 410. An air leak signal may be accompanied by a 'maintenance required' signal, indicating that aircraft maintenance is needed to address the air leak. If the controller determines that there is $H_2$ present, or that the concentration of $H_2$ present exceeds the LEL of $H_2$, the system proceeds to step 416, wherein the controller signals an $H_2$ leak.

Both step 416 and step 418 then proceed to step 420 wherein an emergency response is triggered. An example embodiment of the emergency response is described below with reference to FIG. 5. After the emergency response is triggered, the system proceeds to step 414, where the system continues monitoring the one or more vacuum pressure values and the one or more hydrogen concentration values by returning to step 404.

FIG. 5 depicts method 500 for emergency response to a hydrogen leak within an aircraft. Method 500 can follow the detection of a hydrogen leak described in method 400. For the purposes of illustration, reference will be made to parts contained within control system 300 for emergency response to hydrogen leakage within an aircraft, as depicted in FIG. 3.

Method 500 begins at step 502, wherein the controller triggers an emergency signal in response to the one or more vacuum pressure values exceeding a predetermined vacuum threshold and/or in response to at least one of the hydrogen concentration values exceeding a percentage of a lower explosive limit concentration value. For example, if the one or more vacuum pressure values exceed a predetermined threshold, while the one or more concentration values do not exceed a percentage of a lower explosive limit concentrations value, an air leakage emergency signal is triggered. In another example, if the one or more vacuum pressure values exceed a predetermined threshold, and the one or more concentration values exceed a percentage of a lower explosive limit concentrations value, a hydrogen leakage emergency signal is triggered.

At step 504, the controller transmits a signal to the emergency vacuum release valve. The emergency vacuum release valve is fluidly coupled to an emergency vacuum, such as emergency vacuum 326. Emergency vacuum 326 is configured to eject residual hydrogen fuel or residual air from the control volume to atmosphere. At step 506, the emergency vacuum release valve is opened. At step 508, residual hydrogen fuel or residual air contained within the control volume is ejected to atmosphere.

Method 500 can optionally include emitting a warning signal to a connected aircraft communication system in response to at least one of the vacuum pressure values exceeding a predetermined vacuum threshold and/or in response to the one or more hydrogen concentration values not exceeding a predetermined percentage of a lower explosive limit concentration value of hydrogen. For example, in an air emergency condition, a warning signal can be emitted to indicate that future maintenance is required as the vacuum seal has been compromised.

Method 400 and method 500 provide methods for detection and response to a hydrogen fuel leak or a compromised vacuum in the control volume. According to the described methods, a hydrogen fuel leak can be detected by both a vacuum sensor and by a hydrogen detector, thereby allowing for a two-level leak detection system. Further, upon detection of a leak, emergency response methods can be triggered, thereby mitigating the resulting damage from the leak. Thus, the techniques of this disclosure allow for accurate and timely hydrogen fuel leak detection and response, and a compromised vacuum in the control volume.

DISCUSSION OF POSSIBLE EMBODIMENTS

The following are non-exclusive descriptions of possible embodiments of the present invention.

A system for detecting hydrogen leakage in an aircraft including a hydrogen tank configured to store hydrogen fuel and a fuel pipeline fluidly connected between the hydrogen tank and a downstream engine includes an enclosed chamber, the enclosed chamber surrounding the hydrogen tank and the fuel pipeline. The system further includes one or more vacuum pumps fluidly connected to an interior of the enclosed chamber to create a control volume vacuum within the enclosed chamber, the one or more vacuum pumps located downstream of the hydrogen tank. The system further includes one or more vacuum sensors mounted within the control volume vacuum. The system further includes one or more hydrogen detectors fluidly connected to a vacuum pump exhaust pipeline downstream of the one or more vacuum pumps.

The system of the preceding paragraph can optionally include, additionally and/or alternatively, any one or more of the following features, configurations and/or additional components:

A further embodiment of the foregoing system, further including an emergency vacuum, wherein a first end of the emergency vacuum is fluidly connected to the control volume vacuum, and a second end of the emergency vacuum is coupled to atmosphere external to the aircraft.

A further embodiment of any of the foregoing systems, further including a controller and an emergency vacuum release valve. The emergency vacuum release valve is fluidly connected between the control volume vacuum and the emergency vacuum. The controller is coupled to the emergency vacuum release valve. The controller is coupled to the one or more vacuum sensors, wherein the one or more vacuum sensors are configured to transmit one or more vacuum pressure values to the controller. The controller is coupled to the one or more hydrogen detectors, wherein the one or more hydrogen detectors are configured to transmit one or more hydrogen concentration values to the controller.

A further embodiment of any of the foregoing systems, wherein the controller is configured to send a signal to open the emergency vacuum release valve, thereby permitting flow from the control volume vacuum to atmosphere external to the aircraft via the emergency vacuum, in response to at least one of the vacuum pressure values exceeding a predetermined vacuum threshold.

A further embodiment of any of the foregoing systems, wherein the controller is configured to send a signal to open the emergency vacuum release valve, thereby permitting flow from the control volume vacuum to atmosphere external to the aircraft via the emergency vacuum, in response to at least one of the one or more vacuum pressure values exceeding a predetermined vacuum threshold and in response to at least one of the one or more hydrogen concentration values exceeding a predetermined percentage of a lower explosive limit concentration value of hydrogen.

A further embodiment of any of the foregoing systems, wherein the controller is configured to calculate a change in vacuum pressure over time based upon the one or more vacuum pressure values.

A further embodiment of any of the foregoing systems, wherein the controller is configured to send a signal to open the emergency vacuum release valve, thereby permitting flow from the control volume vacuum to atmosphere external to the aircraft via the emergency vacuum, in response to the change in vacuum pressure over time of at least one of the one or more vacuum sensors exceeding a predetermined rate of change threshold.

A further embodiment of any of the foregoing systems, wherein the controller is configured to send a signal to open the emergency vacuum release valve, thereby permitting flow from the control volume vacuum to atmosphere external to the aircraft via the emergency vacuum, in response to the change in vacuum pressure over time of at least one of the one or more vacuum sensors exceeding a predetermined rate of change threshold and in response to at least one of the one or more hydrogen concentration values exceeding a predetermined percentage of a lower explosive limit concentration value of hydrogen.

A further embodiment of any of the foregoing systems, wherein the controller is configured to emit an air leakage emergency signal to a connected aircraft communication system in response to at least one of the one or more vacuum pressure values exceeding a predetermined vacuum threshold while the one or more hydrogen concentration values are below a predetermined percentage of a lower explosive limit concentration value of hydrogen.

A further embodiment of any of the foregoing systems, wherein the air leakage emergency signal includes an indication that maintenance is required on the control volume vacuum.

A further embodiment of any of the foregoing systems, wherein the one or more hydrogen detectors are fluidly coupled to an aircraft air cycle system such that cabin air is routed to the one or more hydrogen detectors.

A further embodiment of any of the foregoing systems, wherein the one or more hydrogen detectors are fluidly coupled to the downstream engine such that bleed air is routed to the one or more hydrogen detectors.

A further embodiment of any of the foregoing systems, wherein the hydrogen tank contains liquid $H_2$.

A further embodiment of any of the foregoing systems, wherein the controller is configured to emit a low-level alarm in response to the one or more hydrogen concentration values being within a first percentage range of a lower explosive limit concentration value of hydrogen and wherein the controller is configured to emit a high-level alarm in response to the one or more hydrogen concentration values being within a second percentage range of a lower explosive limit concentration value of hydrogen.

A method for detecting hydrogen leakage in an aircraft, the aircraft including a hydrogen tank configured to store hydrogen fuel and a fuel pipeline fluidly connecting the hydrogen tank to a downstream engine, includes evacuating an enclosed chamber that surrounds the hydrogen tank and surrounds the fuel pipeline via one or more vacuum pumps to create a control volume vacuum. The method further includes sensing, via one or more vacuum sensors further includes sensing, via one or more hydrogen detectors fluidly connected downstream of the one or more vacuum pumps, one or more hydrogen concentration values. The method further includes transmitting the one or more vacuum pressure values and the one or more hydrogen concentration values to a controller. The method further includes evaluating, via the controller, whether an emergency condition is met in response to the one or more vacuum pressure values and/or the one or more hydrogen concentration values.

A further embodiment of the foregoing method, wherein the emergency condition is met when at least one of the one or more vacuum pressure values exceeds a predetermined vacuum threshold and when at least one of the one or more hydrogen concentration values exceeds a predetermined percentage of a lower explosive limit concentration value of hydrogen.

A further embodiment of any of the foregoing methods, further including transmitting a signal from the controller to the emergency vacuum release valve, wherein the emergency vacuum release valve is fluidly connected to an emergency vacuum, the emergency vacuum configured to eject hydrogen from the control volume to atmosphere external to the aircraft. The method further includes opening the emergency vacuum release valve. The method further includes ejecting the hydrogen fuel from the control volume to atmosphere external to the aircraft via the emergency vacuum.

A further embodiment of any of the foregoing methods, wherein the one or more hydrogen detectors are fluidly coupled to the downstream engine such that bleed air is routed to the one or more hydrogen detectors.

A further embodiment of any of the foregoing methods, wherein the one or more hydrogen detectors are fluidly coupled to an aircraft air cycle system such that cabin air is routed to the one or more hydrogen detectors.

A further embodiment of any of the foregoing methods, further including emitting an air leakage emergency signal to a connected aircraft communication system in response to at least one of the one or more vacuum pressure values exceeding a predetermined vacuum threshold while the one or more hydrogen concentration values are below a predetermined percentage of a lower explosive limit concentration value of hydrogen.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for detecting hydrogen leakage in an aircraft, the aircraft including a hydrogen tank configured to store hydrogen fuel and a fuel pipeline fluidly connected between the hydrogen tank and a downstream engine, the system comprising:
    an enclosed chamber, the enclosed chamber surrounding the hydrogen tank and the fuel pipeline;
    one or more vacuum pumps fluidly connected to an interior of the enclosed chamber to create a control volume vacuum within the enclosed chamber, the one or more vacuum pumps fluidly connected to the interior of enclosed chamber at a location downstream of the hydrogen tank;
    one or more vacuum sensors mounted within the control volume vacuum and configured to sense a vacuum pressure at one or more locations within the control volume vacuum;
    one or more hydrogen detectors fluidly connected to a vacuum pump exhaust pipeline downstream of the one or more vacuum pumps;
    an emergency vacuum, wherein a first end of the emergency vacuum is fluidly connected to the control volume vacuum, and a second end of the emergency vacuum is coupled to atmosphere external to the aircraft;
    an emergency vacuum release valve fluidly connected between the control volume vacuum and the second end of the emergency vacuum;
    a controller coupled to the emergency vacuum release valve, wherein:
        the controller is coupled to the one or more vacuum sensors, wherein the one or more vacuum sensors are configured to transmit one or more vacuum pressure values to the controller; and
        the controller is coupled to the one or more hydrogen detectors, wherein the one or more hydrogen detectors are configured to transmit one or more hydrogen concentration values to the controller;
    wherein the controller is configured to calculate a change in vacuum pressure over time based upon the one or more vacuum pressure values; and
    wherein the controller is configured to send a signal to open the emergency vacuum release valve, thereby permitting flow from the control volume vacuum to atmosphere external to the aircraft via the emergency vacuum, in response to the change in vacuum pressure over time of at least one of the one or more vacuum sensors exceeding a predetermined rate of change threshold and in response to at least one of the one or more hydrogen concentration values exceeding a predetermined percentage of a lower explosive limit concentration value of hydrogen.

2. The system of claim 1, wherein the controller is configured to send a signal to open the emergency vacuum release valve, thereby permitting flow from the control volume vacuum to atmosphere external to the aircraft via the emergency vacuum, in response to at least one of the vacuum pressure values exceeding a predetermined vacuum threshold.

3. The system of claim 1, wherein the controller is configured to send a signal to open the emergency vacuum release valve in response to at least one of the one or more vacuum pressure values exceeding a predetermined vacuum threshold and in response to at least one of the one or more hydrogen concentration values exceeding a predetermined percentage of a lower explosive limit concentration value of hydrogen.

4. The system of claim 1, wherein the controller is configured to emit an air leakage emergency signal to a connected aircraft communication system in response to at least one of the one or more vacuum pressure values exceeding a predetermined vacuum threshold while the one or more hydrogen concentration values are below a predetermined percentage of a lower explosive limit concentration value of hydrogen.

5. The system of claim 4, wherein the air leakage emergency signal includes an indication that maintenance is required on the control volume vacuum.

6. The system of claim 1, wherein the controller is configured to emit a low-level alarm in response to the one or more hydrogen concentration values being within a first percentage range of a lower explosive limit concentration value of hydrogen and wherein the controller is configured to emit a high-level alarm in response to the one or more hydrogen concentration values being within a second percentage range of a lower explosive limit concentration value of hydrogen.

7. The system of claim 1, wherein the one or more hydrogen detectors are fluidly coupled to an aircraft air cycle system such that cabin air is routed to the one or more hydrogen detectors.

8. The system of claim 1, wherein the one or more hydrogen detectors are fluidly coupled to the downstream engine such that bleed air is routed to the one or more hydrogen detectors.

9. The system of claim 1, wherein the hydrogen tank contains liquid $H_2$.

10. A method for detecting hydrogen leakage in an aircraft, the aircraft including a hydrogen tank configured to store hydrogen fuel and a fuel pipeline fluidly connecting the hydrogen tank to a downstream engine, the method comprising:

evacuating an enclosed chamber that surrounds the hydrogen tank and surrounds the fuel pipeline via one or more vacuum pumps to create a control volume vacuum, wherein the one or more vacuum pumps are fluidly connected to the enclosed chamber at a location downstream of the hydrogen tank;

sensing, via one or more vacuum sensors mounted within the control volume vacuum, one or more vacuum pressure values;

sensing, via one or more hydrogen detectors fluidly connected downstream of the one or more vacuum pumps, one or more hydrogen concentration values;

transmitting the one or more vacuum pressure values and the one or more hydrogen concentration values to a controller;

evaluating, via the controller, whether an emergency condition is met in response to the one or more vacuum pressure values and/or the one or more hydrogen concentration values;

emitting an air leakage emergency signal to a connected aircraft communication system in response to at least one of the one or more vacuum pressure values exceeding a predetermined vacuum threshold while the one or more hydrogen concentration values are below a predetermined percentage of a lower explosive limit concentration value of hydrogen.

11. The method of claim 10, wherein the emergency condition is met when at least one of the one or more vacuum pressure values exceeds a predetermined vacuum threshold and when at least one of the one or more hydrogen concentration values exceeds a predetermined percentage of a lower explosive limit concentration value of hydrogen.

12. The method of claim 11, further comprising:

transmitting a signal from the controller to the emergency vacuum release valve, wherein the emergency vacuum release valve is fluidly connected to an emergency vacuum, the emergency vacuum configured to eject hydrogen from the control volume to atmosphere external to the aircraft;

opening the emergency vacuum release valve; and ejecting the hydrogen fuel from the control volume to atmosphere external to the aircraft via the emergency vacuum.

13. The method of claim 10, wherein the one or more hydrogen detectors are fluidly coupled to the downstream engine such that bleed air is routed to the one or more hydrogen detectors.

14. The method of claim 10, wherein the one or more hydrogen detectors are fluidly coupled to an aircraft air cycle system such that cabin air is routed to the one or more hydrogen detectors.

\* \* \* \* \*